May 13, 1924.

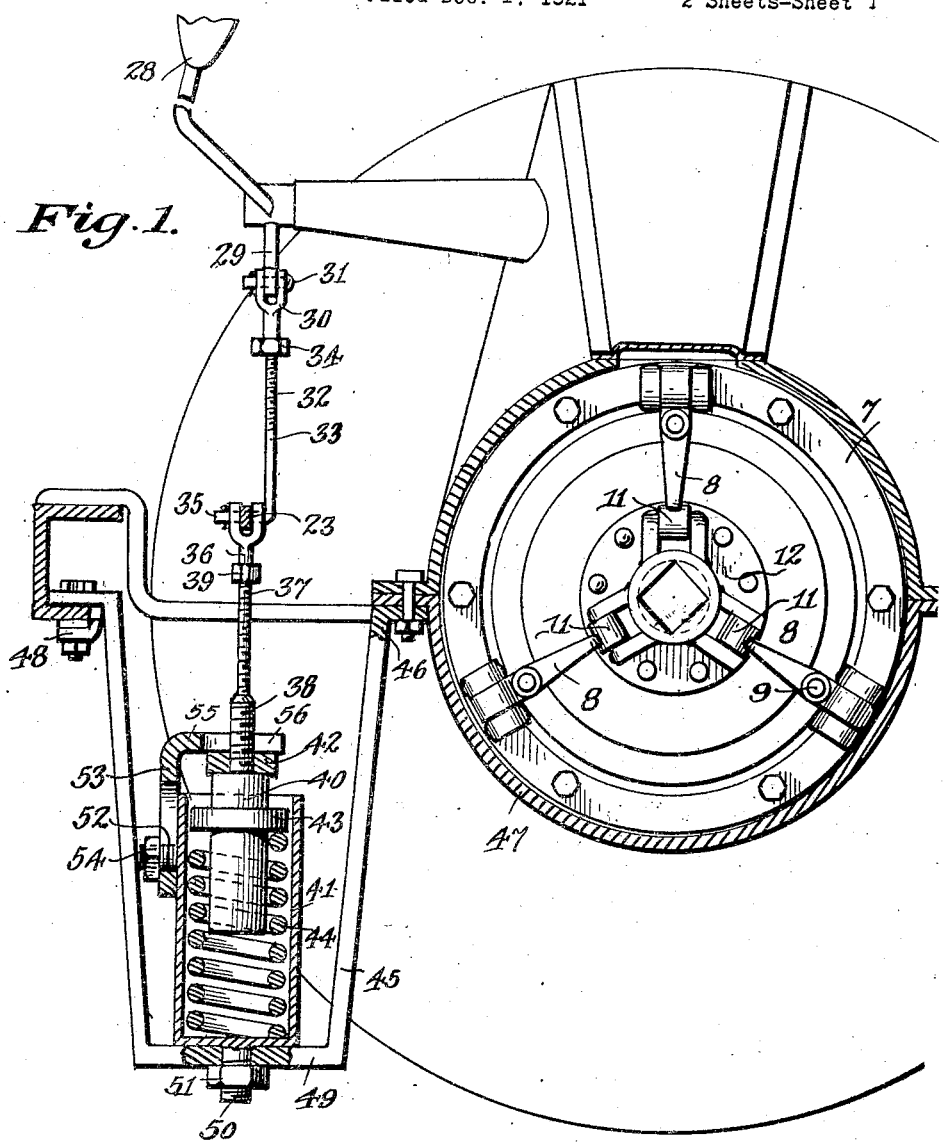

M. H. MILLER

CLUTCH CONTROL MECHANISM

Filed Dec. 1, 1921

Murl H. Miller, Inventor

Patented May 13, 1924.

1,493,940

UNITED STATES PATENT OFFICE.

MURL H. MILLER, OF SAPULPA, OKLAHOMA.

CLUTCH-CONTROL MECHANISM.

Application filed December 1, 1921. Serial No. 519,193.

*To all whom it may concern:*

Be it known that I, MURL H. MILLER, citizen of the United States, residing at Sapulpa, in the county of Creek and State of Oklahoma, have invented certain new and useful Improvements in Clutch-Control Mechanism, of which the following is a specification.

This invention relates to new and useful improvements in control mechanisms for clutch mechanisms of the disk type which are used in conjunction with planetary transmissions.

The primary object of the invention is to provide a control device which will entirely eliminate the forward and rear thrusts or pressure which is ordinarily exerted upon parts of the clutch, transmission, crank shaft and other parts thereof by the clutch spring which is at present used upon the driving plate assembly for assisting in the operation of the clutch shift. This object is accomplished by eliminating the usual clutch spring and substituting therefor and to one side of the clutch mechanism, a structure which will perform the necessary function of the clutch spring, and yet will eliminate the disadvantages thereof herein before mentioned.

Other objects and advantages of the invention will become apparent during the course of the following description.

In the accompanying drawings forming a part of the description and wherein like numerals are employed to designate like parts throughout the several views, Figure 1 is a section through a portion of the control taken on the line 1—1 of Figure 2.

Figure 3:
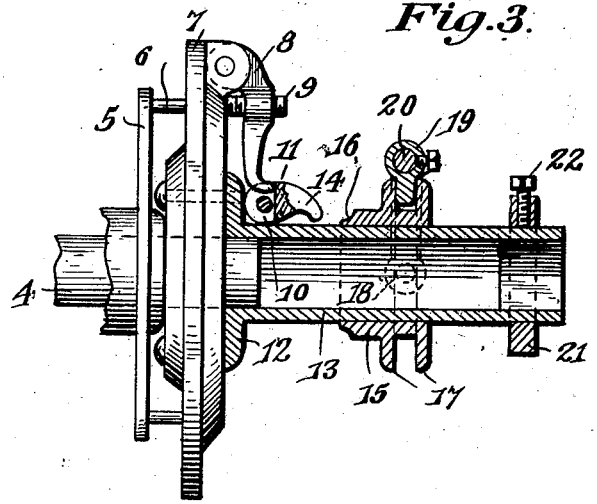
Figure 3 is a longitudinal section through a portion of the device known as the driving plate assembly illustrating its association with the well known driving plate of the clutch mechanism and the clutch fingers associated therewith.

It is a well recognized fact that the clutch springs of clutches used in conjunction with planetary transmissions as employed in a well known make of automobile, do not give complete satisfaction in that they subject the moving parts of the clutch, transmission, crank shaft bearing, engine cylinders, primer mechanisms and other such parts associated with the crank shaft to forward and rearward strains or pressure thereby causing these parts to become unnecessarily worn with the readily appreciable disadvantageous results of "knocking," leaky cylinders and other results which are detrimental to the engine. This is due to the fact that when the parts of the clutch are in neutral, reverse and first speed position, the clutch spring is compressed between the clutch shift and clutch spring support which causes a rearward pressure upon the clutch spring support and consequently other parts of the clutch which are directly or indirectly connected thereto. When the parts of the clutch are in position to effect a direct driving connection between the crank shaft and transmission shaft, the clutch spring is expanded, but not to its extent and consequently this spring exerts a forward pressure upon the clutch shift, driving plate and other parts associated therewith to effect a forward thrust of pressure upon various of the parts of the engine hereinabove enumerated. It it therefore the object of my present invention to eliminate the herein mentioned evils resulting from the usual clutch springs and this is effected by entirely eliminating the ordinary clutch spring and substituting therefor a spring control mechanism which is located to one side of the clutch mechanism so as not to exert the forward and rearward pressures herein enumerated.

In the drawings wherein for the purpose of illustration is shown the preferred embodiment of my invention, the numeral 4 designates the rear end of an ordinary crank shaft of an internal combustion engine which extends through the transmission mechanism and clutch. Only so much of the clutch as is connected to my invention and is necessary for a complete understanding of the invention is shown, and the ordinary push ring of the clutch mechanism is indicated by the numeral 5, it being understood that pushpins 6 extend from a face of the push ring and project through a driving plate 7 which is of the type used in conjunction with clutches employed in a well known type of car. The exposed face of the driving plate is formed for the pivotal connection thereto of a plurality of clutch fingers 8, each of which has a screw 9 associated therewith for cooperation with a push pin 6 of the push ring. The clutch fingers are curved rearwardly as shown and are adapted to be received in the slotted ends 10 of auxiliary fingers 11 forming a part of my invention. These slotted ends of the auxiliary clutch fingers are pivotally connected in the same manner as the clutch fingers 8 to the forward flanged end 12 of a special driving shaft 13. This special driving shaft which is tubular and is substituted for the driving shaft which forms a part of the usual driving plate and has its forward end secured upon the rear end of the crank shaft whereby the flange 12 of the special driving shaft may be bolted or otherwise secured to the exposed face of the driving plate.

It is to be particularly noted that the free ends of the clutch fingers 8 are adapted to normally abut the end walls of the slots in the auxiliary clutch fingers 11 so that when the latter are caused to pivot they exert a forward pressure upon the free ends of the clutch fingers 8 thereby causing them to move forwardly whereby their screws 9 engage the pins 6 and move the push ring 5 inwardly of the clutch. The free ends of the auxiliary clutch fingers are curved first outwardly of the special driving shaft 13, then inwardly thereof to form the fingers with bills 14 which are normally spaced from the driving shaft 13.

Mounted upon this special driving shaft 13 is a sliding clutch shift 15 which has its forward end curved to provide a nose 16 adapted to enter in between the free ends of the auxiliary clutch fingers and the drive shaft to cause the fingers to move outwardly thereof. This clutch shift is also provided with a pair of spaced annular flanges 17 which provide the shift with an annular groove or channel into which project the arms 18 of a clutch release fork 19. This fork is secured to a clutch lever shaft 20 which is common in the clutch shifts of the types of clutches herein mentioned, and extends above and transversely to the special shaft 13 in the well known manner. A collar 21 having a set screw 22 associated therewith, is fastened upon the rear end of the special driving shaft 13 to restrict the rearward sliding movement of the clutch shift 15.

As stated above, the clutch lever shaft 20 is of the ordinary construction and one end thereof extends in the well known manner laterally of the transmission housing where its free end is equipped with a clutch lever 23 which is of the ordinary construction having its rear end provided with a set screw 24 which depends for engagement with the cam 25 of a speed lever 26 secured to a controller or rock shaft 27. This shaft 27 is of the usual construction and has the ordinary brake lever (not shown) attached thereto. This shaft also controls the clutch, as will be hereinafter more fully described.

The other end of the clutch lever 23 is not connected to the ordinary slow speed connection as in present constructions, but before describing connections with this end of the clutch lever, it is well to leave it for a minute and consider the parts which lead up to this connection. These parts as clearly shown in Figure 1, consist of the ordinary clutch pedal 28 which has depending therefrom an apertured arm 29. The connection between this arm of the clutch pedal and the forward end of the clutch lever forms a part of my invention, and consists of a clevis 30 having its free end pivotally associated with the arm 29 of the clutch pedal by means of a cotter pin 31 or any other suitable means. The shank of this clevis is interiorly and exteriorly screw threaded whereby the upper threaded end 32 of a slow gear connecting rod 33 can be threadedly engaged in the shank of the clevis while a nut 34 can be threaded upon the exterior threads of the clevis shank. The lower end of this slow gear connection 33 is bent at right angles as at 35 to extend through the apertured forward end of the clutch lever and also through the arms of a clevis 36 whereby both are pivotally connected to the clutch lever.

The shank of the clevis 36 is formed similar to the shank of the clevis 30 and is adapted to receive therein the upper threaded reduced end 37 of a connecting rod 38, a nut 39 being associated with the reduced end of the rod for effecting and maintaining adjustments between the clevis and connecting rod. The lower end of the connecting rod 38 is exteriorly screw threaded as clearly seen throughout its entire length, the lowermost end of the connecting rod being threadedly engaged in a recess in the upper end of a plunger 40 adapted to operate in a cylinder 41. A rather large nut 42 is threaded upon the connecting rod 38 to normally abut the top of the plunger 40 and to provide stop means to be hereinafter described. The body of the plunger is provided with an annular outwardly extending flange 43 which forms an abutment for the upper end of a compression spring 44 located in the cylinder 41.

A support for the cylinder is formed by a U-shaped stirrup 45, the inner arm of which at its uppermost end is angularly disposed to be bolted as at 46 to the flanges of the transmission housing 47. The free end of the other arm of the stirrup is likewise angularly disposed and provided with a threaded opening to receive therein a bolt which also passes through a clamping plate 48 for fastening this arm to the frame of the vehicle. The bridge portion 49 of the stirrup is provided with a central aperture for the reception of a threaded stud bolt 50 carried by the lower end of the cylinder and which depends therefrom, a nut 51 being associated with the bolt for securely clamping the cylinder upon the bridge portion.

The cylinder 41 is also provided with a laterally extending screw threaded stud bolt 52 for extension through an elongated slot provided in a stop plate 53 which is clamped to the side of the cylinder by means of a nut 54 threaded upon the stud bolt 52. Obviously then, the stop plate can be adjusted vertically of the cylinder by simply loosening the nut 54. The upper end of the stop plate is bent at right angles as at 55 so that the upper end of the plate extends inwardly. This angularly disposed upper end of the stop plate is provided with a slot 56 through which the connecting rod 38 extends.

Figure 2:
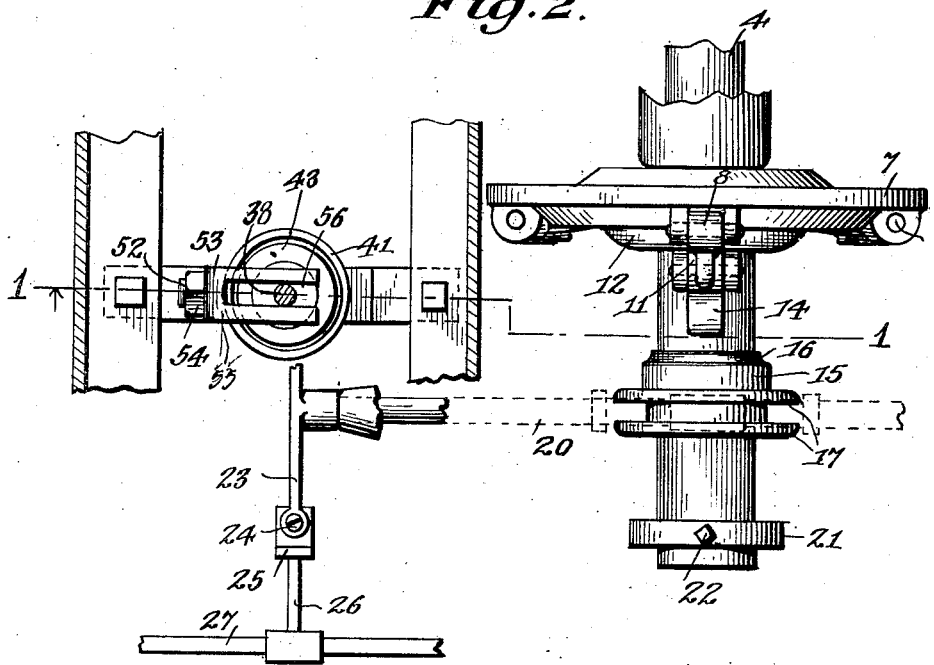
Figure 2 is a top plan of the invention.

In operation, it will be seen that when the vehicle is standing still, reversing or running at low speed, the plunger 40 will be disposed in the lower end of the cylinder 41 to compress the coiled spring 44 therein in view of the fact that the shaft 20 will have been rotated in a clockwise direction (when looking toward the left in Figure 2). Consequently, the forward end of the clutch lever will be lowered and the clutch shift will be disposed out of engagement with the auxiliary clutch fingers 11, and will be subjected to forward movement for engagement with the auxiliary clutch fingers when the coiled spring 44 within the cylinder is released. Obviously, since the old form of clutch spring on the driving shaft 13 has been dispensed with, there will be no rearward thrust or pressure upon any other parts of the clutch or engine as hereinbefore outlined. When the speed lever 26 is disengaged from the clutch lever by operating the controller shaft 27, the clutch pedal 28 is moved forwardly by the foot of the operator to cause the forward end of the clutch lever to be lifted which by connection with the plunger, will raise the latter and permit the coiled spring 44 to expand approximately to its extent so that it will not have a tendency to expand further. In this position of the plunger, as clearly shown in Figure 1, the nut or stop 42 abuts the angularly disposed end of the stop plate 53 so that further expansion of the coiled spring will not affect the clutch lever. During the lifting movement of the forward end of the clutch lever, it will be appreciated that the clutch lever shaft 20 will be rotated to cause the clutch shift 15 to move forwardly upon the special driving shaft 13 whereby the nose 16 of the shift will be forced under the auxiliary clutch fingers 11 to expand the same. Their movement will cause the free ends of the clutch fingers 8 to move toward the driving plate 7 and consequently the screws 9 associated with the clutch fingers 8 will exert a forward pressure on the pins of the push ring. This forward movement of the push ring, as is well understood, will cause cooperation of the clutch disks not shown, whereby direct connection between the crank shaft and transmission or driving shaft of an automobile will be effected. Inasmuch as the spring 44 will not exert a force to move the clutch shift 15 beyond a given point, it will be obvious that there will be no forward strain or pressure exerted upon any of the parts of the clutch or engine as hereinbefore stated would exist if the old form of clutch spring were used directly upon the driving shaft 13.

When the brake lever (not shown) on controller shaft 27 is in a vertical position, the lever 26 on shaft 27 engages the adjusting screw 24 carried by the clutch lever 23 and holds the clutch in neutral position, but by pushing the brake lever (not shown) on controller shaft 27 forward toward the front of the car said lever 26 on shaft 27 moves forward and away from adjusting screw 24 carried by the clutch lever 23.

Spring tension being exerted on clutch lever 23 on the opposite end thereof from the adjusting screw 24 causes an upward movement of lever 23, which in turn rocks clutch lever shaft 20 upward and backward toward rear of car. The upward rocking movement of clutch shaft 20 causes the forward movement of shift collar 15, which enters under the auxiliary clutch fingers 11. This operates the clutch, which causes a direct drive between the crank shaft and drive shaft. In this cycle of operation, after the shift collar 15 has entered under the expanded auxiliary fingers 11 to the greatest diameter of the nose on the shift collar, it is then unnecessary for any more spring tension. If the spring tension was not limited it would still maintain pressure on shift collar 15 forcing it forward until the front side of the flange 17 on the shift collar 15 came to rest on the ends of the auxiliary fingers 11, which in turn would cause a continuous forward pressure on the whole power plant. This is the undesirable action and the idea is to remove any and all lateral or end pressure on the crank shaft and the operating parts of the entire power plant.

It can be seen that after the auxiliary fingers 11 have reached their greatest expansion on the nose of the shift collar 15 it is desirable to stop the expansion of the clutch spring 44, which is accomplished by setting the plate 53, just before the front side of a flange 17 on shift collar 15 touches the outer ends of the auxiliary fingers 11. This effectively limits the further expansion of the spring 44 and removes all end stresses in either direction on the crank shaft and operating parts, which is the desired result.

The controller shaft 27 is a rocking shaft, and operates the emergency brake only when the brake lever (not shown) is pulled backward to its limit, but by having the speed lever 26 on the shaft, which engages the adjusting screw 24 carried by the clutch lever 23 when the brake lever is in a vertical position, the shaft also controls the clutch by holding the clutch lever shaft 20 in neutral position. When the brake lever (not shown) on controller shaft 27 is pushed forward to its limit it releases the rear brakes, disengages the speed lever 26 from clutch lever adjusting screw 24 on the clutch lever 23 rocking shaft 20 which moves shift collar 15 between the auxiliary fingers 11, which in turn operates the clutch.

As the brake lever (not shown) on controller shaft 27 is pulled back from forward position or direct drive of the clutch the speed lever 26 engages the screw 24 on lever 23, which raises the back end of the lever 23 rocking the shaft 20, which moves the shift collar 15 backward from out of engagement with the auxiliary fingers 11, which creates the neutral position of the clutch. Also at the same time the lever 23 pushes down on connecting rod 38 and plunger 40 thus compressing clutch spring 44 and holding it in neutral or compressed position until it is desired to engage the clutch in direct driving position by shoving the brake lever (not shown) on controller shaft 27 to its furthest forward position.

Therefore controller shaft 27 controls direct drive of the clutch, neutral position of the clutch and the release of the compression of the clutch spring 44.

The foregoing description and accompanying drawings have reference to what might be considered to be the approved or preferred form of my invention. I desire it to be understood that I may make such changes in the construction, combination and arrangement of parts materials, dimensions, etc., as may prove expedient and fall within the scope of the appended claims.

Having thus fully described my invention what I claim as new and desire to secure as Letters Patent is:

1. The combination with a clutch mechanism including reciprocatory shifting parts, a clutch shift and lever therefor; of a spring pressed plunger connected with said clutch lever and disposed at right angles to the clutch lever, and means for limiting the movement of the plunger to relieve the clutch mechanism of axial strains.

2. The combination with a clutch mechanism including reciprocatory moving parts, a clutch shift associated therewith and having a clutch lever associated therewith, a clutch pedal, of a spring pressed plunger, connections between the clutch lever and the plunger and the clutch pedal and the lever, and means for releasably retaining the clutch lever in position to retain the plunger depressed and the parts of the clutch in neutral, first speed or reverse position.

3. The combination with a clutch mechanism including a push ring and pivoted clutch fingers; of a special driving shaft; pivoted auxiliary clutch fingers carried thereby and adapted for cooperation with the main clutch fingers to exert pressure thereon, a sliding clutch shift engageable with the auxiliary clutch fingers for spreading the same and forcing the main clutch fingers into cooperative engagement with the push ring, a clutch shaft for controlling the shift, a clutch lever associated with said shaft, and spring pressed means associated with the clutch lever for retaining the clutch shift disengaged from the auxiliary clutch fingers.

4. The combination with a clutch mechanism including reciprocatory shifting parts; of a special driving shaft associated with the clutch mechanism, a sliding clutch shift mounted thereon a clutch shaft for controlling the shift, a clutch lever carried by the shaft, a spring pressed plunger connected to one end of the clutch lever, and stop means for limiting the expansive movement of the spring pressed plunger which is adapted to restrict the forward movement of the clutch shift.

In testimony whereof I affix my signature in presence of two witnesses.

MURL H. MILLER.

Witnesses:
C. F. CHAPMAN,
J. B. LAMPTON.